US 6,701,791 B2

(12) United States Patent
Delajoud

(10) Patent No.: US 6,701,791 B2
(45) Date of Patent: Mar. 9, 2004

(54) MODULAR PISTON GAUGE METHOD AND APPARATUS

(75) Inventor: Pierre R. Delajoud, Neuilly sur Seine (FR)

(73) Assignee: CalAmerica Corp., Phoenix, AZ (US)

( * ) Notice: Subject to any disclaimer, the term of this patent is extended or adjusted under 35 U.S.C. 154(b) by 0 days.

(21) Appl. No.: 09/991,186

(22) Filed: Nov. 16, 2001

(65) Prior Publication Data

US 2003/0094049 A1 May 22, 2003

(51) Int. Cl.$^7$ .................................................. G01L 7/16
(52) U.S. Cl. ............................. 73/744; 73/1.65; 73/1.68
(58) Field of Search .......................... 73/744, 745, 746, 73/1.65, 1.68

(56) References Cited

U.S. PATENT DOCUMENTS 5,025,654 A * 6/1991 Haefner ...................... 73/1.65
5,331,838 A * 7/1994 Delajoud .................... 73/1.65

OTHER PUBLICATIONS

"PG 7000 Piston Gauges—Reference Level Pressure Standards", DHI Calibration Solutions for Pressure and Flow, DH Instruments, Inc., Bro No. 9960. 1B. 10.*

* cited by examiner

Primary Examiner—Edward Lefkowitz
Assistant Examiner—Jermaine Jenkins
(74) Attorney, Agent, or Firm—Cahill, von Hellens & Glazer P.L.C.

(57) ABSTRACT

A device for accurately measuring the pressure (Pg) of very highly pressurized gas includes a cylinder (16) having a cylindrical outer surface (16A) and a bore extending through the cylinder and an elongated piston (23) rotatable and vertically movable in the bore, and supporting calibration weights by means of the piston. An internal reservoir (32) is formed by providing a housing (31) to support the cylinder, the housing including a lower portion engaging a bottom portion of the cylinder and a lower peripheral portion of the cylinder and an upper portion engaging an upper peripheral portion of the cylinder, an inner portion of the housing (31) and a portion of the outer surface (16A). An interior of the reservoir (32) is pressurized through a passage (30A) extending from the reservoir to pressurize gas inlet. A passage (34) conducts pressurized oil from the reservoir into a gap between the piston (23) and the bore.

22 Claims, 5 Drawing Sheets

Pg = GAS PRESSURE MEASURED   Pl = Pg + ρlgh

Pl. = LIQUID PRESSURE   Pl > Pg

Pa = ATMOSPHERIC PRESSURE

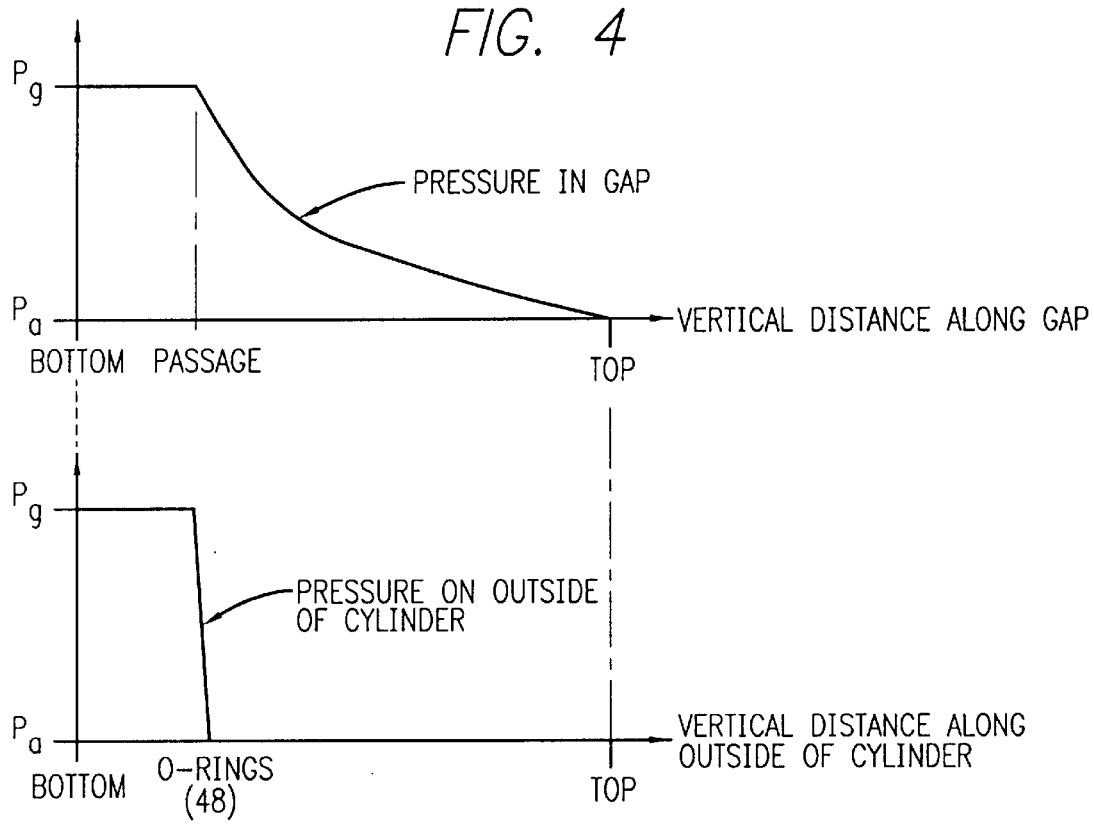
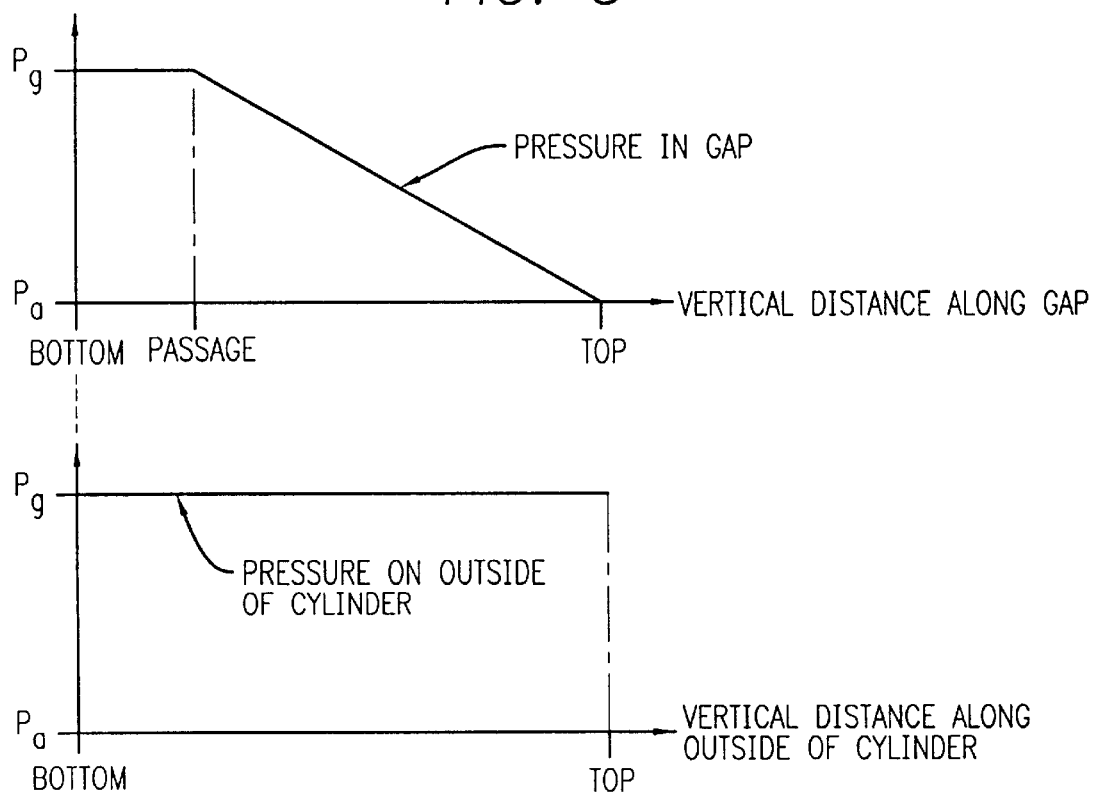

MODULAR PISTON GAUGE METHOD AND APPARATUS

BACKGROUND OF THE INVENTION

The invention relates to dead weight piston fluid pressure gauges/calibration standards, and more particularly to high pressure dead weight piston gas pressure gauges/calibration standards.

Dead weight piston pressure measurement/calibration devices are well-known. Such devices ordinarily include a piston supporting a selected number of calibration weights. A "dead weight piston assembly" includes the piston, a bell housing, and the calibration weights. The piston is slidably disposed in a cylinder, in very low frictional relationship to the cylinder. Fluid, which can be gas or liquid the pressure of which is to be defined or measured, is metered into the bottom of the cylinder so as to push the dead weight piston assembly upward. When the force produced on the bottom of the piston by the pressurized fluid equals the weight of the dead weight piston assembly, the dead weight piston assembly "floats" in an equilibrium condition, wherein a downward force exerted by the piston and supported by the pressure is equal to the total mass multiplied by the gravitational constant. The opposing upward force is produced by the pressure Pg of the gas being measured against the effective area of the piston-cylinder assembly.

Generally, the piston supports a hollow, cylindrical bell housing that in turn supports the annular weights to be loaded on the piston. A horizontal annular flange or ledge is attached to and extends outwardly from a lower outer surface of the bell housing, and one or more annular weights typically are loaded on the annular flange. The piston, bell housing, and annular weight assembly is very precisely and symmetrically shaped and balanced. A selected number of the calibration weights are stacked on the ledge for the purpose of precisely establishing the total weight of the dead weight piston assembly. A spin then is imparted to the dead weight piston assembly, which is sufficiently symmetrical about the vertical axis of the piston that the piston spins freely within the cylinder, the outer surface of the piston being lubricated from the walls of the cylinder by a thin layer of fluid, which can be gas or liquid. The known weight of the dead weight piston assembly and the known "effective area" of the "piston-cylinder" are used to precisely compute the pressure of the fluid being supplied to support the dead weight piston assembly in a "free-floating" equilibrium condition between upper and lower stops of the dead weight piston calibration device.

The closest prior art is thought to include (1) commonly assigned U.S. Pat. No. 5,331,838 entitled "DEAD WEIGHT PISTON DRIVE AND CONTROL SYSTEM", by Delajoud, issued Jul. 26, 1994, (2) the device shown in FIG. 1, described below, (3) and the "integrated piston-cylinder metrological modules" used in the assignee's PG 7000 line of piston gauge products. Above-mentioned U.S. Pat. No. 5,331,838 is incorporated herein by reference.

Gas is much less viscous than oil. Consequently, unless the gap between the rotating piston and the cylinder is very small (0.3 to 0.8 microns), using gas as the lubricant in the gap results in the rotating piston not being as well centered within the cylinder as if oil is used as the lubricating fluid. It is extremely difficult to maintain such a small gap at high pressure due to manufacturing constraints and deformation of the piston and cylinder with respect to pressure. Therefore, pressurized oil normally is used to lubricate the gap between the rotating piston and cylinder for high pressure operation. However, there is a need for piston gauges operating at high pressure using gas as the test medium. Due to the difficulty of lubricating the piston-cylinder with gas at high pressure, the conventional approach is to use an oil operated piston gauge combined with an oil to gas interface external from the piston gauge. However, this method adds uncertainty to the value of the gas pressure due to lack of knowledge of the exact level of the oil to gas interface and is impractical to operate due to the need to maintain the oil to gas level when changing the pressure.

Approximately 20 years ago a French company named Desgranges et Huot developed the system shown in "prior art" FIG. 1 to solve the problems associated with the use of high pressure gas in a piston gauge by "indirectly" lubricating the gap between the piston and cylinder with oil. The main benefits of the system of "prior art" FIG. 1 are (1) that the piston-cylinder gap can be a larger size that works well with oil piston gauges, (2) that the "drop rate" of the piston is much lower than with gas, since the viscosity of oil is higher than the viscosity of the gas being measured, and (3) that the operation of the piston-cylinder is unaffected by the cleanliness of gas under the piston.

Referring to FIG. 1, the pressurized gas to be measured is introduced through passage 43 into volume 42, and exerts upward force on the bottom of rotating piston 23, which supports a mass (not shown) supported by piston head 10. The pressure Pg of the gas to be measured is transmitted through a tube 44 to the top of a small oil reservoir 45 containing lubricating oil 46.

The bottom of oil reservoir 45 is coupled by a tube 47 through the wall of cylinder 16 between two O rings 48 and 49 into the approximately 1 micron gap between the vertical wall of piston 23 and the wall of cylinder 16. The top level of the oil 46 in reservoir 45 is located a distance h above the point at which the channel 47 enters the gap, so the pressure of a column of the oil 46 always is added to the gas pressure Pg and ensures that none of the pressurized gas enters into the gap. The distance h is large enough that the head pressure of the oil 46 ensures that the oil pressure is higher than the gas pressure under the piston so that there is a slight flow of oil out the bottom end of the gap as indicated by arrow 50B, thus preventing any of the high-pressure gas from displacing oil in the gap. The main flow of oil out of the upper end of the gap as indicated by arrow 50A is produced by the addition of the gas pressure Pg and the head pressure of the oil.

The system of FIG. 1 provides gas pressure measurements at the relatively low levels of accuracy that were needed 10 to 20 years ago. However, a problem of the system of FIG. 1 is that in order to change the range of pressures of gas to be measured, it often is necessary to interchange the piston assembly 23, and the cylinder 16. To accomplish this interchanging for the device of FIG. 1, it is necessary to first remove the piston assembly 23,10, and then remove the cylinder 16. However, when piston 23 is removed, the head pressure of oil 46 in reservoir 45 causes a relatively large amount of the oil to leak out by flowing through channel 47 into the volume left open by the removal of piston 23, and the large flow of oil continues after cylinder 16 is removed. That is quite problematic, because the oil in volume 42, if not purged, may contaminate the gas which is measured next after another cylinder and piston have been installed. But purging the oil from volume 42 is time-consuming and costly, and also can pollute a laboratory environment with oil vapor. When oil 46 leaks or must be drained from reservoir 45, it may be excessively time-consuming and expensive to refill the reservoir with the special oil which may be required.

A much larger problem associated with the piston gauge shown in FIG. 1 is that for very high gas pressures, e.g., for Pg greater than approximately 7 MPa (1000 psi), the structure causes deformation of both piston 23 and cylinder 16. The deformation of the cylinder that occurs is difficult or impossible to model mathematically, so the pressure deformation coefficient of the piston-cylinder assembly cannot be accurately mathematically computed. This makes it difficult or impossible to accurately determine the variation of "effective area" of the piston-cylinder 23,16 with respect to pressure. The only way to determine the variation of the "effective area" with pressure is by comparison to an oil pressure standard for which the deformation coefficient is well known.

The mounting system for cylinder 16 within the housing 31 in FIG. 1 results in the very high pressure Pg (of the gas being measured) being applied directly on the portions of the surfaces of piston 23 and cylinder 16 below O ring 48. However, only the low ambient pressure Pa is exerted at the top of cylinder 16 and on the portion of the outside surface of cylinder 16 located above O ring 48. Thus, there is an extremely abrupt drop in the pressure exerted across the wall of cylinder 16 (e.g., up to 70 to 100 MPa (10,000 to 15,000 psi)) from a location just below to a location just above O ring 48. That abrupt pressure drop causes cylinder 16 to deform unpredictably, i.e., in a way that is not possible to accurately model mathematically. That makes it very difficult or impossible to accurately compute the effective area of piston-cylinder 23,16. Another factor that further increases the uncertainty in the knowledge of the pressure deformation coefficient, and hence the "effective area" of piston 23 (also referred to as the "effective area" of piston-cylinder 23,16), is non-reproduceability of the deformation coefficient that occurs due to slight displacement in the positions of the O rings when the cylinder is removed and replaced.

Since the measurement of the pressure Pg is determined by multiplying the total mass of piston 23 and the other mass supported thereon by the gravitational constant g, divided by the "effective area" of piston-cylinder 23,16, the system of prior art FIG. 1 is incapable of providing the accurate measurements of gas pressures above roughly 7 MPa (1000 psi) needed for many current applications.

Thus, there is an unmet need for an improved piston gauge which is capable of accurate measurement of very high gas pressures, e.g. above roughly 7 MPa (1000 psi). There also is a need for an improved very high pressure piston gauge which avoids the above described abrupt deformation of the cylinder.

SUMMARY OF THE INVENTION

Accordingly, it is an object of the invention to provide an interchangeable piston-cylinder module for a piston-cylinder-based pressure measurement gauge that is capable of accurately measuring very high gas pressures.

It is another object of the invention to provide an interchangeable piston-cylinder module for a dead weight piston gauge or the like that is capable of defining very high gas pressures, up to approximately 100 MPa (15,000 psi), with very low measurement uncertainty, e.g., less than +–30 ppm of the measured pressure.

It is another object of the invention to provide an interchangeable piston-cylinder module for a dead weight piston gauge or the like that is capable of accurately measuring very high fluid pressures.

It is another object of the invention to provide an interchangeable piston-cylinder module for a dead weight piston gauge or the like that is capable of accurately measuring gas pressure at very high pressures, for example as high as 100 MPa (15,000 psi) or more.

It is another object of the invention to provide a piston-cylinder module for a dead weight piston gauge or the like which avoids inaccuracy in measurement of high gas or liquid pressure due to very non-ideal deformation of the cylinder caused by very high gas or liquid pressure to be measured.

It is another object of the invention to provide a piston-cylinder module for a dead weight piston gauge or the like which avoids contamination that occurs in the system itself and the device or devices it may be connected to for prior art dead weight piston gauges due to flow of lubricating oil or other fluid when the piston-cylinder is removed, for example to interchange it with a more suitable piston-cylinder.

It is another object of the invention to provide a piston-cylinder module for a dead weight piston gauge or the like which conveniently allows different fluids to be used to lubricate the gap between the piston and the cylinder so that oil of different viscosities can be used, depending on gap size and for special applications (e.g., for fluorinated oil for oxygen service).

It is another object of the invention to provide a piston-cylinder module for a dead weight piston gauge or the like which can operate with either gas or liquid as the pressurized medium.

It is another object of the invention to provide a piston-cylinder module mounting post that can be operated with either liquid lubricated, gas operated piston-cylinder modules or liquid operated piston-cylinder modules.

Briefly described, and in accordance with one embodiment thereof, the invention provides a technique for accurately measuring the pressure (Pg) of very highly pressurized fluid, by providing a cylinder (16) having a cylindrical outer surface (16A) and a bore extending through the cylinder and an elongated piston (23) rotatable and vertically movable in the bore, and supporting calibration weights by means of the piston. An internal reservoir (32) is formed by providing a housing (31) to support the cylinder. The housing includes a lower portion engaging a bottom portion of the cylinder and a lower peripheral portion of the cylinder, and also includes an upper portion engaging an upper peripheral portion of the cylinder, an inner portion of the housing (31) and a portion of the outer surface (1 6A). The interior of the reservoir (32) is pressurized to the high pressure (Pg) of the fluid through a first passage (30A) extending from an upper portion of the reservoir to an inlet opening (31B) of the housing (31) coupled to receive the highly pressurized fluid. A first O ring (33) forms a first seal between a bottom surface of the cylinder and the lower portion of the annular housing (31), and a second O ring (39) forms a second seal between a top surface of the cylinder and a flange (29) associated with an upper portion of the annular housing (31). A quantity of oil (46) of suitable viscosity is provided in the reservoir. The first passage (30A) extends from an upper portion of the reservoir above the surface of the oil to the inlet opening (31B). A second passage (34) extends from a lower portion of the reservoir below the surface of the oil through a wall of the cylinder into the bore to conduct pressurized oil into a gap between the piston (23) and the bore.

The invention is described in an embodiment including an interchangeable module (100) for use in a dead weight piston pressure measurement device, wherein the interchangeable module includes a cylinder (16) having a cylindrical outer surface (16A) and a bore extending through the cylinder, an elongated piston (23) rotatable and vertically movable in the bore, a piston supporting calibration weights, and an annular housing (31) for supporting the cylinder, the housing including a lower portion engaging a bottom portion of the cylinder and a lower peripheral portion of the cylinder and an upper portion engaging an upper peripheral portion of the cylinder, an inner portion of the housing (31) and a portion of the outer surface (16A) forming an annular internal oil reservoir (32). A quantity of oil (46) is held in the oil reservoir. The first passage (30A) extends from an upper portion of the oil reservoir above the surface of the oil to an inlet opening (31B) to pressurize the reservoir at the pressure (Pg) of a fluid to be measured, and a second passage (34) extends from a lower portion of the oil reservoir below the surface of the oil through a wall of the cylinder into the bore to conduct pressurized oil into the gap between the piston (23) and the bore. A first O ring (33) forms a first seal between a bottom surface of the cylinder and the lower portion of the annular housing (31), and a second O ring (39) forms a second seal between a top surface of the cylinder and a flange (29) associated with an upper portion of the annular housing (31). In the described embodiment, the third O ring (35) forms a seal between the flange (29) and the upper portion of the annular housing. In the described embodiment, the first O ring 33 is disposed concentrically along a peripheral portion of the bottom surface of the cylinder (16), and the second O ring 39 is disposed concentrically along a peripheral portion of the top surface of the cylinder, and the first O ring (33) is disposed on the cylinder symmetrically relative to the second O ring (39). The pressure of the fluid to be measured is greater than approximately 100 kPa (15 psi), and wherein ambient atmospheric pressure (Pa) is present at an edge of the gap at the upper surface of the cylinder, wherein a pressure equal to the pressure (Pg) of the fluid to be measured is exerted uniformly against the portion of the cylindrical outer surface (16A) forming the oil chamber (32), and wherein pressure on the surface of the bore of the cylinder (16) varies gradually from a second passage (34) to the upper surface of the cylinder so that no abrupt deformation of the cylinder occurs due to the pressure of the fluid to be measured.

BRIEF DESCRIPTION OF THE DRAWINGS

FIG. 4 is a graph illustrating (a) the pressure along the gap between the piston and cylinder in the piston gauge of prior art FIG. 1, and (b) the pressure along the outside surface of the cylinder in the piston gauge of prior art FIG. 1.

FIG. 5 is a graph illustrating (a) the pressure along the gap between the piston and cylinder in the piston gauge of FIG. 3, and (b) the pressure along the outside surface of the cylinder in the piston gauge of FIG. 3.

DETAILED DESCRIPTION OF THE PREFERRED EMBODIMENTS

Figure 2:
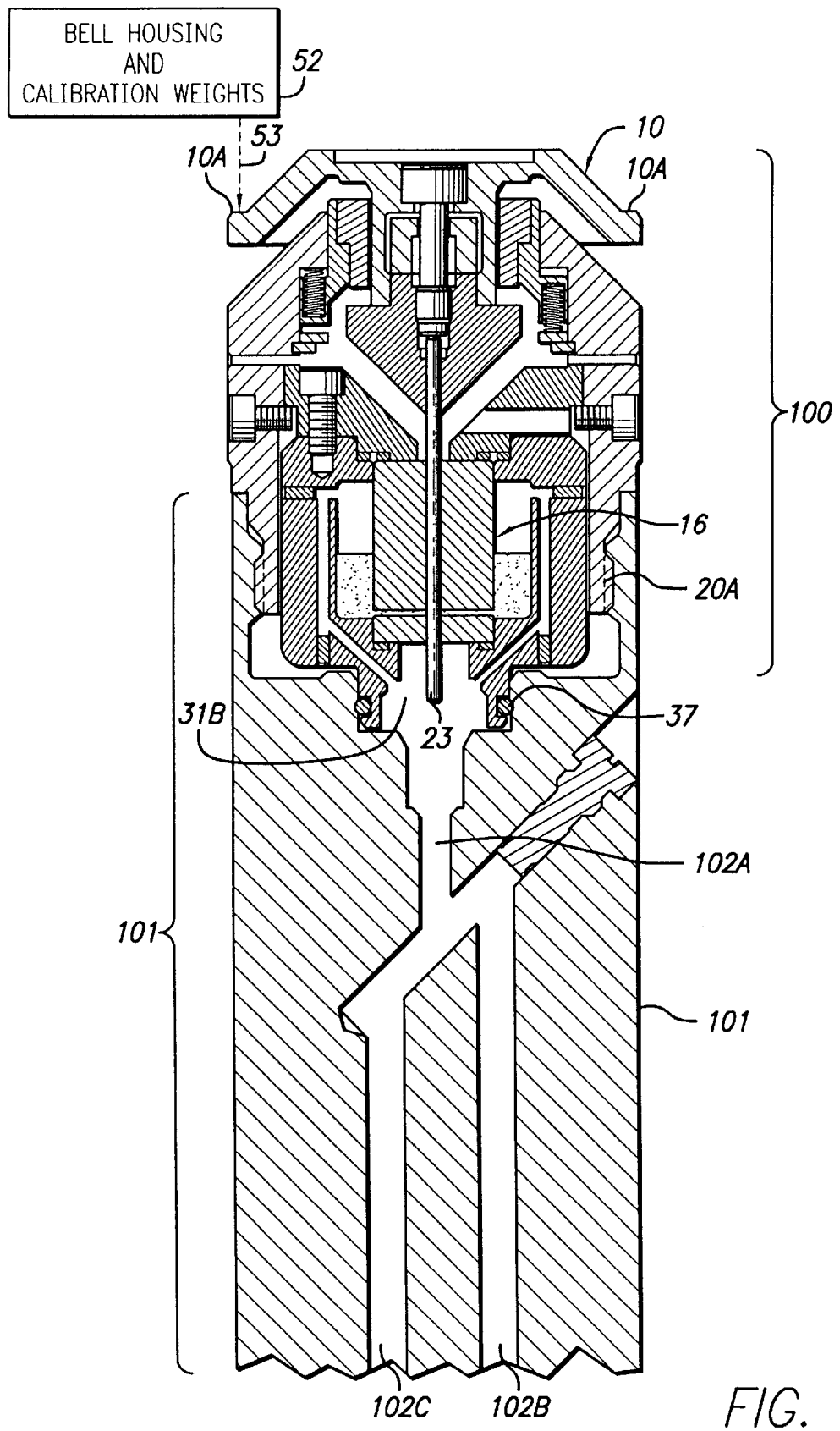
FIG. 2 is a section view illustrating an interchangeable piston-cylinder module of the present invention installed on a mounting post.

Referring to FIG. 2, an interchangeable piston-cylinder module 100 of the present invention is installed onto (actually, threaded onto by means of threads 20A) the mounting post 101 of a piston gauge pressure measurement/ calibration device. Piston-cylinder module 100 includes a piston cap 10 having an annular ledge 10A that supports a conventional bell housing (not shown) on which one or more conventional annular precision calibration weights are supported. Reference numeral 52 designates the bell housing and the annular calibration weights supported on ledge 10A, as indicated by dashed line 53. Piston cap 10 is supported by an internal piston 23 which rotates in a stationery cylinder 16. The system for imparting rotation to piston 23 and piston cap 10 is not shown, but is described in detail in above referenced U.S. Pat. No. 5,331,838.

Highly compressed gas, the pressure Pg of which is to be measured/calibrated, is introduced through passages 102B and 102A of mounting post 101 into a volume 31B into which the lower end of piston 23 extends. When the pressure Pg of the gas on the bottom of piston 23 lifts the rotating piston 23, piston cap 10, bell housing, and precision calibration weights supported thereon into a free-floating equilibrium condition, the pressure Pg of the gas can be computed with high accuracy, even at extremely high values of Pg of up to roughly 100 MPa (15,000 psi).

The bottom of passage 102C in FIG. 2 is ordinarily plugged, and is provided to collect the small amount of oil that leaks out of the gap between piston 23 and cylinder 16 and flows downward along the walls of passages 102A and 102C. The plug (not shown) can be occasionally removed to drain the oil. Details of piston-cylinder module 100 which make the high accuracy computation possible according to the present invention are shown more clearly in FIG. 3.

Figure 3:
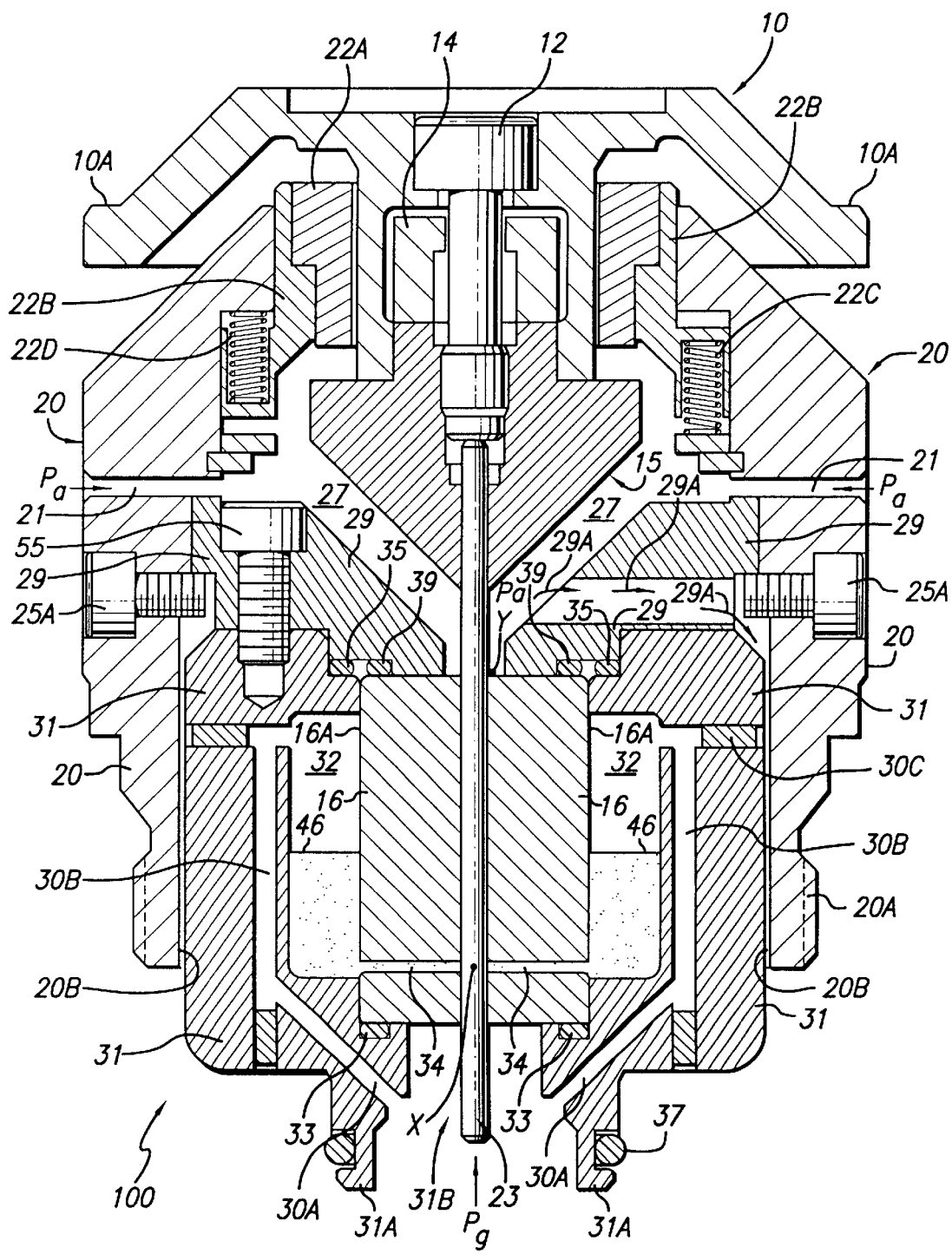
FIG. 3 is an enlarged section view illustrating details of the piston-cylinder module shown in FIG. 2.

Referring to FIG. 3, interchangeable piston-cylinder module 100 includes the piston cap 10, an upper portion of which is securely attached by means of a captive screw 12 to a piston head 15. An annular "adjusting weight" 14 includes a threaded hole through which captive screw 12 extends. A spring-loaded upper stop and lower stop assembly which includes elements 22A, 22B, 22C and 22D engages piston cap 10 or piston head 15 as described in detail in above referenced U.S. Pat. No. 5,331,838.

The spring-loaded stop assembly is partially surrounded by a housing that is referred to herein as "retaining nut 20", the lower portion of which has circumferential threads 20A that are threaded into mounting block 101 of FIG. 2. A plurality of horizontal radial passages 21 through retaining nut 20 couple the outside ambient pressure Pa into a space 27 located below piston head 15. Retaining nut 20 has a large interior cavity 20B into which an assembly including piston 23, piston head 15, cylinder 16, annular housing 31, and a reservoir cover 29 which encloses and supports cylinder 16 can be inserted and removed.

Piston cap 10 is supported on an elongated piston 23, which rotates in stationery cylinder 16. The lower end portion of piston 23 extends below the lower end of cylinder 16 into volume 31B and receives an upward force exerted by the highly pressurized gas Pg. The upper portion of piston 23 extends through a hole located in piston head 15 and engages the bottom of captive screw 12. Piston 23 is rigidly attached to piston head 15 by a press fit, and piston cap 10 is rigidly attached to piston head 15 by captive screw 12.

Cylinder 16 has a horizontal upper surface which engages a lower surface of reservoir cover 29. An O ring 39 is disposed between reservoir cover 29 and the upper surface of cylinder 16, and provides a high pressure seal between them. Cylinder 16 also has a horizontal lower surface that engages an annular housing 31. An O ring 33 provides a seal between the lower surface of cylinder 16 and a lower portion of annular housing 31. Annular housing 31 includes an upper horizontal surface portion that abuts both a downward facing surface of a reservoir cover 29 and a vertical circumferential surface of the upper portion of cylinder 16. An O ring 35 provides a high-pressure seal between the upper portion of housing 31 and reservoir cover 29. An O ring 37 is disposed in a circumferential groove in the lowest portion 31A of housing 31 to provide a high-pressure seal between housing 31 and mounting post 101 of FIG. 2 when retaining nut 20 is fully threaded into mounting post 101 as shown in FIG. 2.

An annular intermediate element referred to herein as "reservoir cover" 29 is included in the above mentioned assembly which can be inserted into and removed from the cavity 20B of retaining nut 20. Reservoir cover 29 is provided to seal the top of reservoir 32 and maintain a high fluid pressure therein. Reservoir cover 29 has a passage 29A through which oil that leaks upward out of the gap between piston 23 and cylinder 16, at point Y, can escape as indicated by arrow 29A. Reservoir cover 29 is attached to the top of annular housing 31 by a plurality of vertical screws 55. The force of screws 55 holding reservoir cover 29 against the top surface of annular housing 31 also ensures proper compression of O rings 33, 39 and 35. A plurality of horizontal screws 25A extend through the wall of retaining nut 20 into a recess of reservoir cover 29 as shown, to hold the above described assembly 15, 23, 16, 29, 31 within cavity 20B of retaining nut 20. The assembly 15, 23, 16, 29, 31 can be removed from cavity 20B of retaining nut 20 by removing horizontal screws 25A.

In accordance with the present invention, an internal volume or oil reservoir 32 is formed by a portion of the inner surface of housing 31 together with an outer portion of cylinder 16. The bottom portion of oil reservoir 32 is connected in fluid communication with the bore of cylinder 16 through which elongated piston 23 extends by means of a plurality of radial passages 34 through the lower portion of cylinder 16. A quantity of oil 46 of suitable viscosity is permanently contained in reservoir 32. A plurality of passages 30A,30B extend from the volume 31B at the bottom of piston-cylinder module 100 (into which the high pressure gas to be measured is fed through passages 102A and 102B of mounting post 101) to the upper portion of reservoir 32, above the surface of oil 46. Therefore, the very high gas pressure Pg in volume 31B applies a large force on the surface of the oil 46 in reservoir 32, tending to force the oil and transmit the high pressure Pg through the passages 34 into the roughly 1 micron gap between the surface of rotating piston 23 and the bore of cylinder 16. The fluid pressure in passage 34 is therefore slightly higher than the pressure Pg applied under the piston-cylinder in volume 31B, by the amount of pressure resulting from the height of oil 46 in reservoir 32.

By way of definition, the term "piston-cylinder" as used herein in conjunction with the term "effective area" refers to the combination of the piston 23, the cylinder 16, a gap between the piston 23 and the cylinder 16, and the fluid flow profile of fluid in the gap. The effective area of the piston-cylinder is greater than the cross-sectional area of the piston but less than the cross-sectional area of the bore of the cylinder within which the piston is located.

Figure 1:
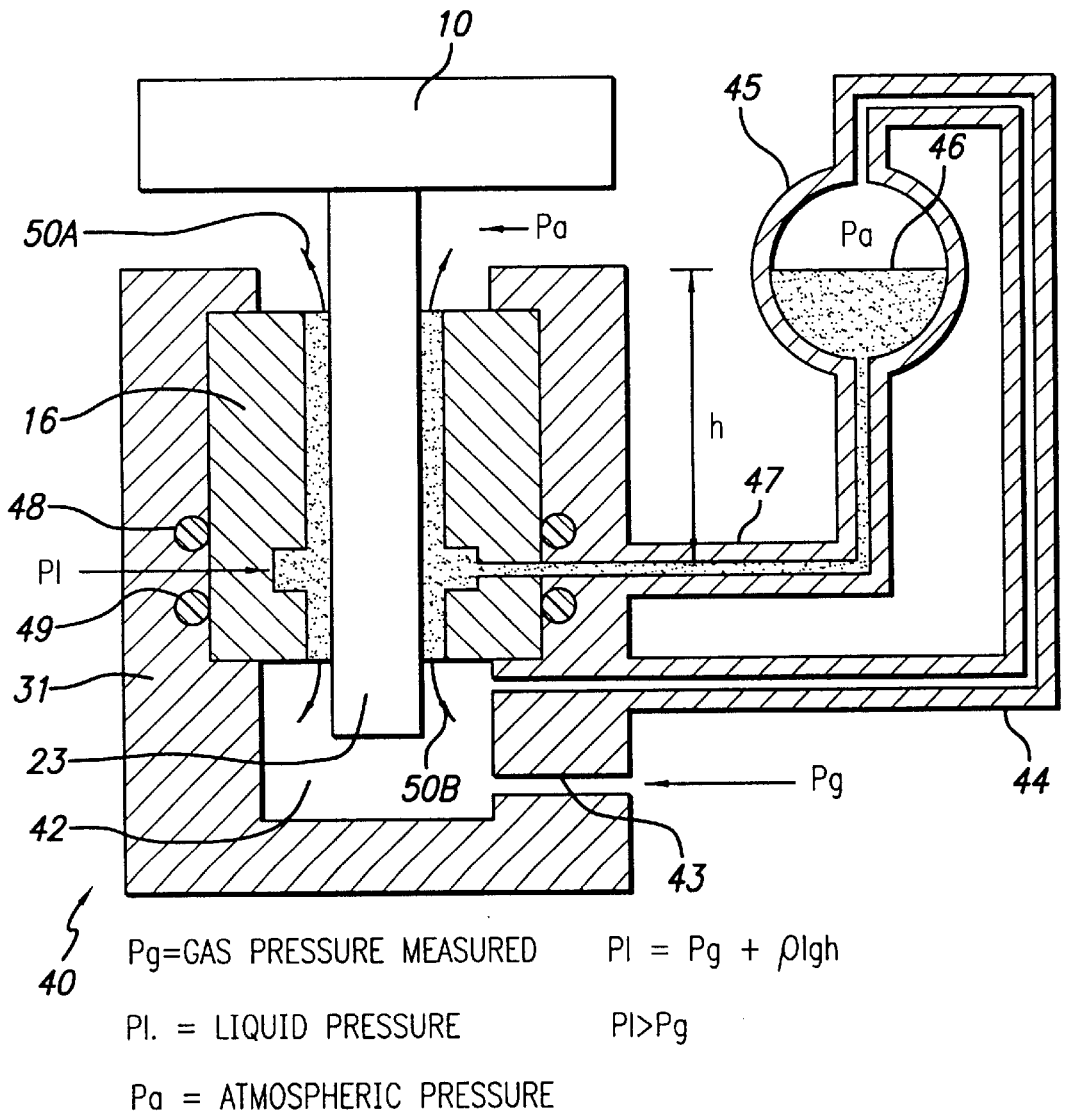
FIG. 1 is a schematic section view diagram illustrating a prior art technique for using pressurized oil to lubricate the gap between the rotating piston and the stationery cylinder of a dead weight piston gauge.

At this point, it will be useful to compare the forces tending to deform the cylinders in "prior art" FIG. 1 and above described FIG. 3. Referring first to the graph in FIG. 4, the upper curve shows how the pressure in the gap between piston 23 and the bore of cylinder 16 in prior art FIG. 1 varies nonlinearly from an extremely high value Pg of, e.g., 100 MPa (15,000 psi) at the bottom of the gap, to a very low ambient pressure Pa of approximately zero at the top of the gap. The lower curve shows the pressure on the outside surface of cylinder 16, which has the high value Pg at the lower portion of the cylinder up to the location of the O-ring 48, and undergoes a very abrupt transition through a distance equal to the width of O ring 48 to approximately zero psi just above the height of O-ring 48.

The above transition from a pressure as high as 100 MPa (15,000 psi) or more to zero psi in a very short distance of approximately 2 millimeters (0.1 inches) results in the above mentioned un-computable deformation of cylinder 16.

Referring next to the graph in FIG. 5, the upper curve shows how the pressure in the gap between piston 23 and the bore of cylinder 16 in FIG. 3 varies from an extremely high value Pg of, e.g., 100 MPa (15,000 psi) from the bottom of the gap to the location X at level of passages 34 to a very low ambient pressure Pa of approximately zero at the location Y. The lower curve shows the high pressure Pg on the entire outside surface of cylinder 16.

The above described very abrupt transition (FIG. 4) in the deformation force across the wall of cylinder 16 for prior art FIG. 1 is avoided by the structure of FIG. 3. The structure of FIG. 3 results in a gradual, linear change in the deformation force across the wall of cylinder 16 as shown in the upper curve of FIG. 5, and allows the structure to be conveniently mathematically modeled so that the deformation coefficient can be accurately computed as a function of the dimensions of piston 23 and cylinder 16, and various parameters of the material of which piston 23 and cylinder 16 are formed. The article "Elastic Distortion of Piston-Cylinder Systems of Pressure Balances" by G. Klingenberg, Metrologia 22, 259–263 (1986) discloses solutions of elastic differential equations for radio and axial distortions of the piston and the cylinder.

The following equations show how the deformation coefficient of piston 32 and cylinder 16 and the "effective area" of the two are determined for the structure of FIG. 3.

$$P = M^* gl (1 - \rho_{air}/\rho_m)/A_{eff}(1+\lambda^* P)[1+(\alpha_p + \alpha_c)(T-293.15)], \quad \text{Eq. (1)}$$

wherein: P is the pressure defined by the piston-cylinder assembly,

M is the total mass loaded on the piston (kg), gl is the local gravity (m*s$^{-2}$), $\rho_{air}$ is the density of air around a mass (kg*m$^{-3}$), $\rho_m$ is the density of the mass (kg*m$^{-3}$), $A_{eff}$ is the effective area of the piston-cylinder assembly 23,16 under reference conditions (m$^2$), $\lambda$ is the deformation coefficient of the piston-cylinder assembly 23,16 (Pa$^{-1}$), $\alpha_p$ is the coefficient of thermal expansion of the material of the piston (K$^{-1}$), $\alpha_c$ is the coefficient of thermal expansion of material of the cylinder ( ), and T is the absolute temperature of the piston-cylinder assembly 23,16 (K).

Equation (1) is a general equation for computing the pressure under the piston of a piston-cylinder assembly of a piston gauge when the piston is in a free-floating equilibrium condition. The deformation coefficient $\lambda$ in Equation (1) for the structure of FIG. 3 can be computed from the following equation:

$$\lambda = (3^* \mu_p - 1)/2^* E p + [3^* \mu_c + (\phi_p^2 - 3^* \phi_c^2)/(\phi_c^2 - \phi_p^2)]/2^* E_c, \quad \text{Eq. (2)}$$

wherein: $\mu_p$ is the Poisson ratio of the piston 23, $\mu_c$ is the Poisson ratio of the cylinder 16, Ep is Young's modulus of the piston 23, Ec is Young's modulus of the cylinder 16, $\phi_p$ is the diameter of the piston 23 (meters), and $\phi_c$ is the external diameter of the cylinder 16 (meters).

It should be appreciated that the validity of Equation (2) is based on the gradual, nearly linear variation of the pressure in the gap between piston 23 and cylinder 16 as shown in the upper curve of FIG. 5, wherein the deformation of cylinder 16 is proportional to the linear variation of the pressure along the gap from point X to point Y in FIG. 3.

The technique of including oil reservoir 32 within interchangeable piston-cylinder module 100 overcomes the above described oil spillage problem of the prior art. Rather than removing the piston and cylinder, which causes free flow of oil from the external reservoir 45 of prior art FIG. 1 into bore of the cylinder, the present invention allows piston-cylinder module 100 in its entirety, including the oil reservoir, oil, and all oil passages, to be interchanged with another similar piston-cylinder module that may have oil of different viscosity and a piston-cylinder 23,16 having a different effective area. Consequently, there is no loss of oil from reservoir 32 to be spilled into the bore of cylinder 16 when the piston-cylinder module is removed in order to change the measurement pressure (Pg) range. This eliminates the laborious oil purging process that has been required when it has been necessary to change the range of pressure measurement/calibration, eliminates the laborious task of re-filling the oil reservoir to replace oil that has leaked or has been drained, eliminates the high cost of special replacement oil, and greatly reduces the likelihood of oil contamination of the system itself and the device or devices it may be connected to.

The locations of O rings 33 and 39 symmetrically at the bottom and top surfaces of cylinder 16 (rather than around the vertical cylindrical surface thereof) reduce the contact force between the top of the cylinder 16 and the upper flange of housing 31. (Note that the bottom O ring 33 is not essential, as other types of seals could be used to prevent oil 46 from leaking out of reservoir 32.) In this manner, the O ring seals reduce the influence on the radial deformation of the cylinder in its active zone in accordance with the Poisson ratio of the material (e.g., tungsten carbide, with a Poisson ratio of approximately 0.2). The cylinder 16 is pushed upward with a reduced force that allows free radial deformation of the upper part of the cylinder relative to the contact surface of the upper inner flange of housing 31. This arrangement allows computation of the pressure deformation coefficient of the piston-cylinder module with an uncertainty of less than 10 percent of its value in the intended measured pressure range of $-3*10^{-6}$ MPa$^{-1}$ to $-2*10^{-6}$ MPa$^{-1}$, which results in an uncertainty of approximately 20 ppm (parts per million) of the pressure at the full-scale point of the highest range.

The new mounting of cylinder 16 is in a negative free deformation configuration that allows the measurement reproduceability to be improved. The gap between the piston and cylinder bore can be adjusted to a larger dimension than was the case in a conventional reentrant mounting system because as the pressure increases, the gap is reduced in the upper part of cylinder to keep the oil leak rate nearly constant and to make the piston drop nearly independent of the pressure Pg. This also allows the pressure profile in the gap between the piston 23 and the cylinder 16 above the entry of oil into the gap (at point X) to be nearly linear because the above mentioned gap variation compensates the reduction of viscosity as the pressure drops from the high pressure Pg to the low pressure Pa. As the initial gap (i.e., the gap between piston 23 and cylinder 16 before high-pressure fluid is introduced into inlet 31B) is larger, the sensitivity of the pressure measurement is improved at low pressure. The new structure results in uniform outside pressure along the entire "working area" of cylinder 16, which results in the nearly linear pressure profile in the gap so as to make the deformation of cylinder 16 mathematically predictable.

Since the oil is essentially permanently contained in each piston-cylinder module, the viscosity of oil in each module can be conveniently adapted to the size of the piston 23 in that module so as to maximize the piston-cylinder module gas pressure measurement sensitivity. For example, for lower pressure, wherein the piston-cylinder diameter is greater, a lower viscosity oil can be used to improve the gas pressure measurement sensitivity. A piston-cylinder module can be "dedicated" (i.e., filled) with special oil to assure compatibility with certain gases to be measured, e.g., oxygen.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention.

For example, the fluid to be measured can be liquid instead of gas, and the pressure of liquid introduced into inlet 31B of the disclosed embodiments of the invention could be up to 100 MPa (15,000 psi).

The provision of O ring 39 on the top surface of cylinder 16 is not essential. For example, O ring 39 could be disposed concentrically around the upper edge portion of cylinder 16 between it and the adjacent portion of housing 31, and some material at the top portion of the bore of cylinder 16 and horizontally facing the O ring could be removed to increase the area. Then the deformation of cylinder 16 due to the O ring disposed concentrically around the upper edge portion of cylinder 16 would not affect the working zone of the cylinder, because the working zone would be lower than the position of the O ring.

Even if no oil is provided in reservoir 32 so that the gap between piston 23 and cylinder 16 is lubricated with a highly pressurize gas to be measured, the same benefits explained above with reference to FIG. 5 are achieved.

The downward calibrating force exerted on piston 23 or piston head 15 does not have to be measured by the bell housing 52 and annular calibration weights supported on ledge 10A as shown in FIG. 2. Instead, the force resulting from the pressure on the piston can be precisely measured by another means, such as a dynamometer (e.g., load cell)

Figure 6:
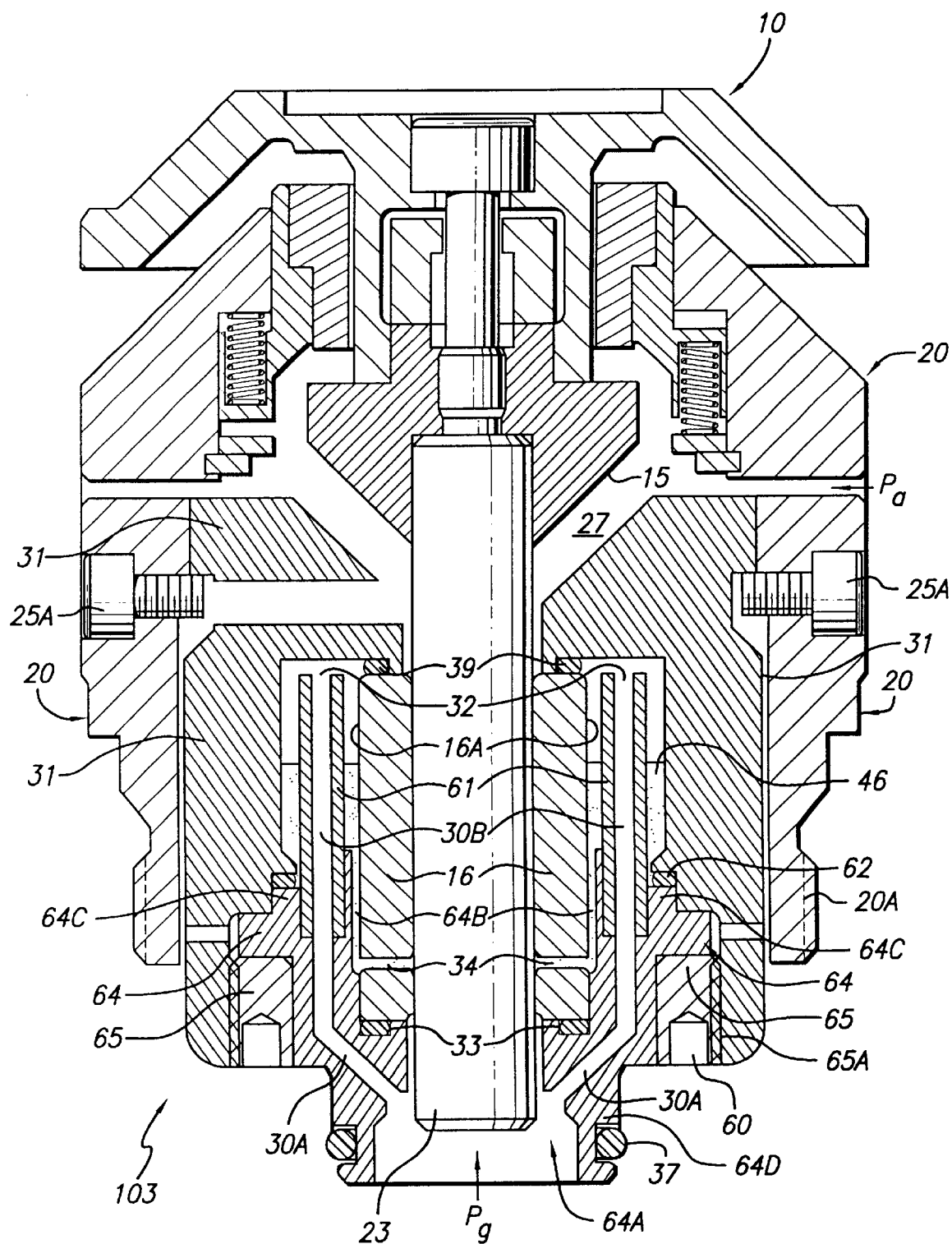
FIG. 6 is a section view of an alternative embodiment of the piston-cylinder module shown in FIG. 3.

Also, it would be possible to make reservoir cover 29 integral with annular housing 31, and modify the bottom portion of annular housing 31 so as to accept a separate "reservoir bottom cover" that is screwed into an internal portion of the bottom part of annular housing 31. FIG. 6 shows a sectional view of a variation on the embodiment of FIG. 3 wherein reservoir cover 29 is integral with the upper portion of annular housing 31, and a removable annular "reservoir bottom cover" 64 is provided to seal the bottom of reservoir 32 and maintain high fluid pressure therein. Where appropriate, the same reference numerals are used in FIG. 6 as in FIG. 3 to designate the same or similar parts. In FIG. 6, passages 30A extend through reservoir bottom 64 from high-pressure inlet 64A to the bottoms of corresponding vertical tubes 61 that extend upward through oil 46 to the top of reservoir 32. A bottom end of each vertical tube 61 is attached to reservoir bottom 64 so as to provide a seal therewith. A passage 64B is provided between reservoir bottom 64 and the other surface 16A of cylinder 16 to provide fluid communication between reservoir 32 in the passages 34. Reference numerals 30B designate the extensions of passages 30A through vertical tubes 61 to the top of reservoir 32. An O ring 62 is compressed between an upper surface of a flange 64C of reservoir bottom 64 to form a seal between it and annular housing 31. Reservoir bottom 64 is retained within a cover-receiving opening in the bottom of annular housing 31 by a threaded annular ring 65 that engages threads 65A of the cover-receiving opening of annular housing 31. Recesses 60 in the bottom of a threaded annular ring 65 allow it to be engaged by a tightening tool. O ring 37 fits within a circumferential recess of a lower portion 64D of reservoir bottom 64 that surrounds high-pressure inlet 64A.

What is claimed is:

1. An interchangeable module for use in a piston-cylinder pressure measurement device, comprising:
   (a) a cylinder having an outer surface and a bore extending through the cylinder;
   (b) an elongated piston vertically movable in the bore, the piston receiving a downward calibration force;
   (c) a housing for supporting the cylinder, the housing including one of a lower portion engaging both a bottom portion of the cylinder and a lower peripheral portion of the cylinder and an upper portion engaging an upper peripheral portion of the cylinder;
   (d) a cover engaging a top portion of the cylinder, the cover, an inner portion of the housing, and a portion of the outer surface of the cylinder forming an internal volume; and
   (e) a first passage extending from an upper portion of the internal volume to an inlet opening of the interchangeable module to pressurize the internal volume at a pressure of a fluid to be measured, and a second passage extending from the internal volume through a wall of the cylinder into the bore to conduct pressurized fluid into a gap between the piston and the bore.

2. An interchangeable module for use in a piston-cylinder pressure measurement device, comprising:
   (a) a cylinder having an outer surface and a bore extending through the cylinder;
   (b) an elongated piston vertically movable in the bore, the piston receiving a downward calibration force;
   (c) a housing for supporting the cylinder, the housing including an upper portion engaging a top portion of the cylinder;
   (d) a bottom cover engaging a bottom portion of the cylinder, an inner portion of the housing, and a portion of the outer surface of the cylinder forming an internal volume; and
   (e) a first passage extending from an upper portion of the internal volume to an inlet opening of the interchangeable module to pressurize the internal volume at a pressure of a fluid to be measured, and a second passage extending from the internal volume through a wall of the cylinder into the bore to conduct pressurized fluid into a gap between the piston and the bore.

3. An interchangeable module for use in a piston-cylinder pressure measurement device, comprising:
   (a) a cylinder having a cylindrical outer surface and a bore extending through the cylinder;
   (b) an elongated piston vertically movable in the bore, the piston supporting one or more calibration weights;
   (c) a housing for supporting the cylinder, the housing including at least one of a lower portion engaging a bottom portion of the cylinder and a lower peripheral portion of the cylinder and an upper portion engaging an upper peripheral portion of the cylinder;
   (d) a reservoir cover engaging a top portion of the cylinder, the reservoir cover, an inner portion of the housing, and a portion of the outer surface of the cylinder forming an internal oil reservoir; and
   (e) a quantity of oil in the oil reservoir, a first passage extending from a portion of the oil reservoir above a surface of the oil to an inlet opening of the interchangeable module to pressurize the oil reservoir at a pressure of a fluid to be measured, and a second passage extending from a portion of the oil reservoir below the surface of the oil through a wall of the cylinder into the bore to conduct pressurized oil into a gap between the piston and the bore.

4. An interchangeable module for use in a dead weight piston pressure measurement device, comprising:
   (a) a cylinder having a cylindrical outer surface and a bore extending through the cylinder;
   (b) an elongated piston rotatable and vertically movable in the bore, the piston supporting one or more calibration weights;
   (c) an annular housing for supporting the cylinder, the housing including a lower portion engaging a bottom portion of the cylinder and a lower peripheral portion of the cylinder and an upper portion engaging an upper peripheral portion of the cylinder;
   (d) a reservoir cover engaging a top portion of the cylinder, the reservoir cover, an inner portion of the housing, and a portion of the outer surface of the cylinder forming an annular internal oil reservoir; and
   (e) a quantity of oil in the oil reservoir, a first passage extending from an upper portion of the oil reservoir above a surface of the oil to an inlet opening of the interchangeable module to pressurize the oil reservoir at a pressure of a fluid to be measured, and a second passage extending from a lower portion of the oil reservoir below the surface of the oil through a wall of the cylinder into the bore to conduct pressurized oil into a gap between the piston and the bore.

5. The interchangeable module of claim 4 including a first O ring forming a first seal between a top surface of the cylinder and the reservoir cover.

6. The interchangeable module of claim 5 including a second O ring forming a second seal between the reservoir cover and the upper portion of the annular housing.

7. The interchangeable module of claim 6 including a third O ring forming a third seal between a bottom surface of the cylinder and the lower portion of the annular housing.

8. The interchangeable module of claim 7 wherein the first O ring is disposed on the cylinder symmetrically relative to the third O ring.

9. The interchangeable module of claim 5 wherein the first O ring is disposed concentrically along a peripheral portion of the top surface of the cylinder.

10. The interchangeable module of claim 4 including a plurality of the first passages each extending from the upper portion of the oil reservoir above the surface of the oil to the inlet opening.

11. The interchangeable module of claim 4 including a plurality of the second passages extending radially from a level below the surface of the oil from the lower portion of the oil reservoir through the wall of the cylinder into the bore.

12. The interchangeable module of claim 4 including a first O ring disposed along the upper periphezal portion of the cylinder.

13. The interchangeable module of claim 4 wherein the pressure of the fluid to be measured is less than or equal to approximately 15,000 pounds per square inch, and wherein an ambient atmospheric pressure is present at an edge of the gap at the upper surface of the cylinder, wherein a pressure equal to the pressure of the fluid to be measured is exerted uniformly against the portion of the outer surface of the cylinder forming the oil reservoir, and wherein pressure on the surface of the bore of the cylinder varies gradually from the second passage to an upper portion of the bore so that no abrupt deformation of the cylinder occurs due to the pressure of the fluid to be measured.

14. The interchangeable module of claim 4 including a piston cap attached to an upper portion of the piston, the piston cap having an annular ledge for supporting a bell housing supporting the one or more calibration weights.

15. The interchangeable module of claim 4 wherein the fluid to be measured is a gas.

16. The interchangeable module of claim 4 including an elastic stop assembly connected between the piston head and the piston cap for limiting vertical movement of the piston beyond an equilibrium zone in which the piston is in a free-floating equilibrium condition.

17. The interchangeable module of claim 4 wherein the pressure of the fluid measured is computed according to the equation $$P = M * gl (1 - \rho_{air}\rho_m)/A_{eff}(1 + \lambda * P)[1 + (\alpha_p + \alpha_c)(T - 293.15)],$$

wherein: P is a pressure defined by a piston-cylinder,

M is total mass loaded on the piston, gl is a local gravitational constant, $\rho_{air}$ is a density of air around the mass, $\rho_m$ is a density of the mass, $A_{eff}$ is an effective area of the piston-cylinder, $\lambda$ is a deformation coefficient of the piston-cylinder, $\alpha_p$ is a coefficient of thermal expansion of material of the piston, $\alpha_c$ is a coefficient of thermal expansion of material of the cylinder, and T is an absolute temperature of the piston-cylinder.

18. The interchangeable module of claim 17 wherein the deformation coefficient $\lambda$ is computed according to the equation $$\lambda = (3 * \mu_p - 1) 2 * E_p + [3 * \mu_c + (\Phi_p^2 - 3 * \Phi_c^2)/(\Phi_c^2 - \Phi_p^2)]/2 * E_c,$$

wherein: $\mu_p$ is a Poisson ratio of the piston, $\mu_c$ is a Poisson ratio of the cylinder, $E_p$ is a Young's modulus of the piston, $E_c$ is a Young's modulus of the cylinder, $\Phi_p$ is a diameter of the piston, and $\Phi_c$ is an external diameter of the cylinder.

19. A dead weight piston pressure measurement device, comprising:

(a) a cylinder having a cylindrical outer surface and a bore extending through the cylinder;

(b) an elongated piston rotatable and vertically movable in the bore, the piston supporting one or more calibration weights;

(c) a housing for supporting the cylinder, the housing including a lower portion engaging a bottom portion of the cylinder and a lower peripheral portion of the cylinder and an upper portion engaging an upper peripheral portion of the cylinder, an inner portion of the housing and a portion of the outer surface forming an internal reservoir;

(d) a first passage extending from the reservoir to an inlet opening to pressurize the reservoir at the pressure of a fluid to be measured; and (e) a first seal between a bottom portion of the cylinder and the lower portion of the housing, and a second seal between a top portion of the cylinder and the housing.

20. The interchangeable module of claim 19 wherein the fluid to be measured is gas and the reservoir is filled with the gas.

21. A dead weight piston pressure measurement device, comprising:

(a) a cylinder having a cylindrical outer surface and a bore extending through the cylinder;

(b) an elongated piston rotatable and vertically movable in the bore, the piston supporting one or more calibration weights;

(c) a housing for supporting the cylinder, the housing including an upper portion engaging a top portion of the cylinder, an inner portion of the housing and a portion of the outer surface forming an internal reservoir;

(d) a first passage extending from the reservoir to an inlet opening to pressurize the reservoir at the pressure of a fluid to be measured; and (e) a first sealing device between a bottom portion of the cylinder and the lower portion of the housing, and a second sealing device between a top portion of the cylinder and the housing.

22. An interchangeable module for use in a piston-cylinder pressure measurement device, comprising:

(a) a cylinder having a cylindrical outer surface and a bore extending through the cylinder and an elongated piston rotatable and vertically movable in the bore;

(b) means for supporting one or more calibration weights by means of the piston;

(c) means for forming an internal reservoir bounded by the cylindrical outer surface by providing a housing to support the cylinder, the housing including a lower portion engaging a bottom portion of the cylinder and a lower peripheral portion of the cylinder and an upper portion engaging an upper peripheral portion of the cylinder; and (d) means for pressurizing the internal reservoir at the pressure of highly pressurized fluid through a first passage extending from an upper portion of the internal reservoir to an inlet opening of the housing coupled to receive the highly pressurized fluid.

* * * * *